US011107118B2

(12) United States Patent
Subramanya et al.

(10) Patent No.: US 11,107,118 B2
(45) Date of Patent: *Aug. 31, 2021

(54) MANAGEMENT OF THE DISPLAY OF ONLINE AD CONTENT CONSISTENT WITH ONE OR MORE PERFORMANCE OBJECTIVES FOR A WEBPAGE AND/OR WEBSITE

(71) Applicant: Walmart Apollo, LLC, Bentonville, AR (US)

(72) Inventors: Shankara B. Subramanya, Sunnyvale, CA (US); Girish Natarajan, Fremont, CA (US); Guoxun Yuan, Sunnyvale, CA (US); Junhao Jiang, Redwood City, CA (US); Madhusudan Mathihalli, San Jose, CA (US); Chris Bolte, Palo Alto, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 221 days.

This patent is subject to a terminal disclaimer.

(21) Appl. No.: 16/154,516

(22) Filed: Oct. 8, 2018

(65) Prior Publication Data

US 2019/0043081 A1 Feb. 7, 2019

Related U.S. Application Data

(63) Continuation of application No. 14/170,096, filed on Jan. 31, 2014, now Pat. No. 10,096,040.

(51) Int. Cl.
*G06Q 30/00* (2012.01)
*G06Q 30/02* (2012.01)

(52) U.S. Cl.
CPC .............................. *G06Q 30/0246* (2013.01)

(58) Field of Classification Search
CPC . G06Q 30/0201–0206; G06Q 30/0242; G06Q 30/0244; G06Q 30/0246;
(Continued)

(56) References Cited

U.S. PATENT DOCUMENTS 4,339,633 A 7/1982 Ahmed
5,327,484 A 7/1994 Connell et al.
(Continued)

FOREIGN PATENT DOCUMENTS

EP 1244036 A1 * 9/2002 ....... G06Q 10/06375
WO 2010126205 11/2010
(Continued)

OTHER PUBLICATIONS

Graepel et al. Web-Scale Baysian Click-Through Rate Prediction For Sponsored Search Advertising In Microsoft's Bing Search Engine. (Apr. 2009). (Year: 2009).*
(Continued)

*Primary Examiner* — James A Reagan
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of collecting training attribute values for a set of attributes; generating a probability model using the training attribute values, the probability model providing predicted outcomes for at least one attribute in the set of attributes; identifying, using the probability model, a first predicted outcome corresponding to a subsequent combination of attribute values collected by a collection module, wherein the predicted outcomes can comprise the first predicted outcome; coordinating a first display of an ad content version of a subsequent webpage
(Continued)

US 11,107,118 B2

Page 2 when the first predicted outcome satisfies an objective of the subsequent webpage, wherein the first display can comprise: (a) an ad at a first location on the subsequent webpage and a webpage content in a first format at a second location on the subsequent webpage; or (b) the ad at a third location on the subsequent webpage and the webpage content in a second format at a fourth location on the subsequent webpage; and coordinating a second display of an ad-free version of the subsequent webpage when the first predicted outcome does not satisfy the objective of the subsequent webpage. Other embodiments are disclosed herein.

20 Claims, 8 Drawing Sheets

(58) Field of Classification Search
CPC ........... G06Q 30/0253; G06Q 30/0254; G06Q 10/067; G05B 13/0265–0295; G06N 99/05
USPC ............. 705/7.29–7.39, 14.41, 14.43, 14.45, 705/14.51, 14.52, 348; 700/57–55; 706/12
See application file for complete search history.

(56) References Cited

U.S. PATENT DOCUMENTS

| | | | |
|---|---|---|---|
| 7,809,672 B1 | 10/2010 | Tenorio | |
| 8,396,864 B1 | 3/2013 | Harinarayan | |
| 8,515,937 B1* | 8/2013 | Sun | G06Q 30/02 707/707 |
| 8,700,495 B2 | 4/2014 | Battle et al. | |
| 8,756,172 B1* | 6/2014 | Radovanovic | G06N 20/00 706/12 |
| 8,862,521 B2* | 10/2014 | Revesz | G06Q 30/0254 706/12 |
| 9,058,406 B2* | 6/2015 | Soroca | G06Q 30/0247 |
| 9,146,894 B2 | 9/2015 | Piepgrass | |
| 9,349,132 B2 | 5/2016 | Cronin et al. | |
| 9,633,103 B2 | 4/2017 | Subramanya et al. | |
| 10,096,040 B2* | 10/2018 | Subramanya | G06Q 30/0246 |
| 2002/0161476 A1 | 10/2002 | Panofsky et al. | |
| 2002/0169657 A1 | 11/2002 | Singh et al. | |
| 2003/0061402 A1 | 3/2003 | Yadav | |
| 2003/0126013 A1* | 7/2003 | Shand | G06Q 30/0269 705/14.52 |
| 2006/0095281 A1* | 5/2006 | Chickering | G06Q 30/0247 705/37 |
| 2006/0190225 A1 | 8/2006 | Brand | |
| 2007/0100981 A1 | 5/2007 | Adamczyk et al. | |
| 2007/0271370 A1 | 11/2007 | Kehl | |
| 2009/0063268 A1 | 3/2009 | Burgess et al. | |
| 2009/0106081 A1* | 4/2009 | Burgess | G06Q 30/0242 705/14.41 |
| 2009/0327032 A1 | 12/2009 | Gunawardana et al. | |
| 2010/0042496 A1* | 2/2010 | Wang | G06Q 30/0264 705/14.49 |
| 2010/0063877 A1* | 3/2010 | Soroca | G06F 16/9577 705/14.45 |
| 2010/0145961 A1 | 6/2010 | Hu et al. | |
| 2011/0015990 A1 | 1/2011 | Sanghavi | |
| 2011/0047025 A1 | 2/2011 | Demir | |
| 2011/0047026 A1 | 2/2011 | Biggs et al. | |
| 2011/0231246 A1 | 9/2011 | Bhatia | |
| 2011/0276581 A1 | 11/2011 | Zelevinsky | |
| 2011/0302031 A1 | 12/2011 | Chen et al. | |
| 2012/0016738 A1 | 1/2012 | Ouimet | |
| 2012/0030011 A1 | 2/2012 | Rey | |
| 2012/0123851 A1 | 5/2012 | Bax | |
| 2012/0158710 A1* | 6/2012 | Burges | G06F 17/3069 707/723 |
| 2012/0191719 A1 | 7/2012 | Musgrove | |
| 2012/0226651 A1 | 9/2012 | Chidlovskii | |
| 2012/0233183 A1 | 9/2012 | Nakahashi et al. | |
| 2013/0133056 A1 | 5/2013 | Taylor | |
| 2013/0138503 A1* | 5/2013 | Brown | G06Q 30/0203 705/14.45 |
| 2014/0129547 A1 | 5/2014 | Sacco | |
| 2014/0172652 A1 | 6/2014 | Pobbathi et al. | |
| 2014/0229281 A1 | 8/2014 | Zimmerman, Jr. et al. | |
| 2015/0095202 A1 | 4/2015 | Subramanya et al. | |
| 2015/0100423 A1* | 4/2015 | Oldham | G06Q 30/0256 705/14.54 |
| 2015/0127468 A1* | 5/2015 | Yi | G06Q 30/0273 705/14.69 |

FOREIGN PATENT DOCUMENTS

| | | | | |
|---|---|---|---|---|
| WO | WO-2010126205 A1 * | 11/2010 | ............. | G06Q 30/02 |
| WO | WO-2013074367 A2 * | 5/2013 | ......... | G06Q 30/0251 |

OTHER PUBLICATIONS

Daniel Zantedeschi et al. Measuring Multi-Channel Advertising Effectiveness Using Consumer-Level Advertising Response Data. (2016). Retrieved online Apr. 23, 2021. https://repository.upenn.edu/cgi/viewcontent.cgi?article=1305&context=marketing_papers (Year: 2016).*
Kyle Bagwell. The Economic Analysis of Advertising. (Aug. 2005). Retrieved online Apr. 23, 2021. https://academiccommons.columbia.edu/doi/10.7916/D8TB1K1S/download (Year: 2005).*
Hilmi Yildirim and Mukkai S. Krishnamoorthy, A Random Walk Method for Alleviating the Sparsity Problem in Collaborative Filtering, Oct. 23-25, 2008 Oct. 23, 2008.
Wooldridge, Introductory Econometrics, 2008, 4th Ed., Chapter 10 Jan. 1, 2008.
Jan Schulz, Jaccard Similarity, May 15, 2008 available at http://www.code10.info/index.php%3Foption%3Dcom_content%26view%3Darticle%26id%3D60:article_jaccard-similarity%26catid%3D38:cat_coding_algorithms_data-similarity%26Itemid%3D57 May 15, 2008.
Information gain in decision trees—Wikipedia, the free encyclopedia, http://en.wikipdia.org/wiki/Information_gain_in_decision_trees, Aug. 25, 2014. Aug. 25, 2014.
DBSCAN—Wikipedia, the free encyclopedia, http://en.wikipedia.org/wiki/DBSCAN, Aug. 25, 2014. Aug. 25, 2014.
Tf-idf—Wikipedia, the free encyclopedia, http://en.wikipedia.org/wiki/Tf%E2%80%93idf, Aug. 25, 2014. Aug. 25, 2014.
Graepel et al., Web-Scale Click-Through Rate Prediction for Sponsored Search Advertising in Microsoft's Bin Search Engine Apr. 2009.

* cited by examiner

MANAGEMENT OF THE DISPLAY OF ONLINE AD CONTENT CONSISTENT WITH ONE OR MORE PERFORMANCE OBJECTIVES FOR A WEBPAGE AND/OR WEBSITE

RELATED APPLICATION

This application is a continuation of pending U.S. application Ser. No. 14/170,096, entitled "Management Of The Display Of Online Ad Content Consistent With One Or More Performance Objectives For A Webpage And/Or Website," filed Jan. 31, 2014, the disclosure of which is hereby incorporated by this reference in its entirety.

FIELD OF THE INVENTION

This invention relates to the fostering of one or more performance metrics for a webpage and/or website and more particularly to the fostering of such performance metrics in conjunction with the potential to display ad content on a webpage.

BACKGROUND OF THE INVENTION

Many different performance metrics may be used to measure the ability of a webpage to meet its objectives. Examples may include a dropout rate, which may measure a percentage of visitors leaving a website from a webpage. Similar examples may include a conversion rate measuring a percentage of user visits to a website and/or webpage on that website that respond to a call to action, such as, for example, to make an online purchase.

In addition to any direct benefits accruing from a webpage and/or website, indirect benefits, such as remuneration, may be recouped through the display of ad content on one or more webpages of a website. Such ad content, however, may have an impact on one or more performance metrics used to gauge the performance of the webpage and/or website on which the ad content is displayed. For example, such ad content may include one or more links to one or more different websites. A visitor clicking on such a link may leave the original webpage and/or website. Similarly, clicking on such a link may decrease the likelihood that the visitor responds to a call to action on the original webpage and/or web site.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not, therefore, to be considered limiting of its scope, the invention will be described and explained with additional specificity and detail through use of the accompanying drawings, in which.

DETAILED DESCRIPTION

Figure 1:
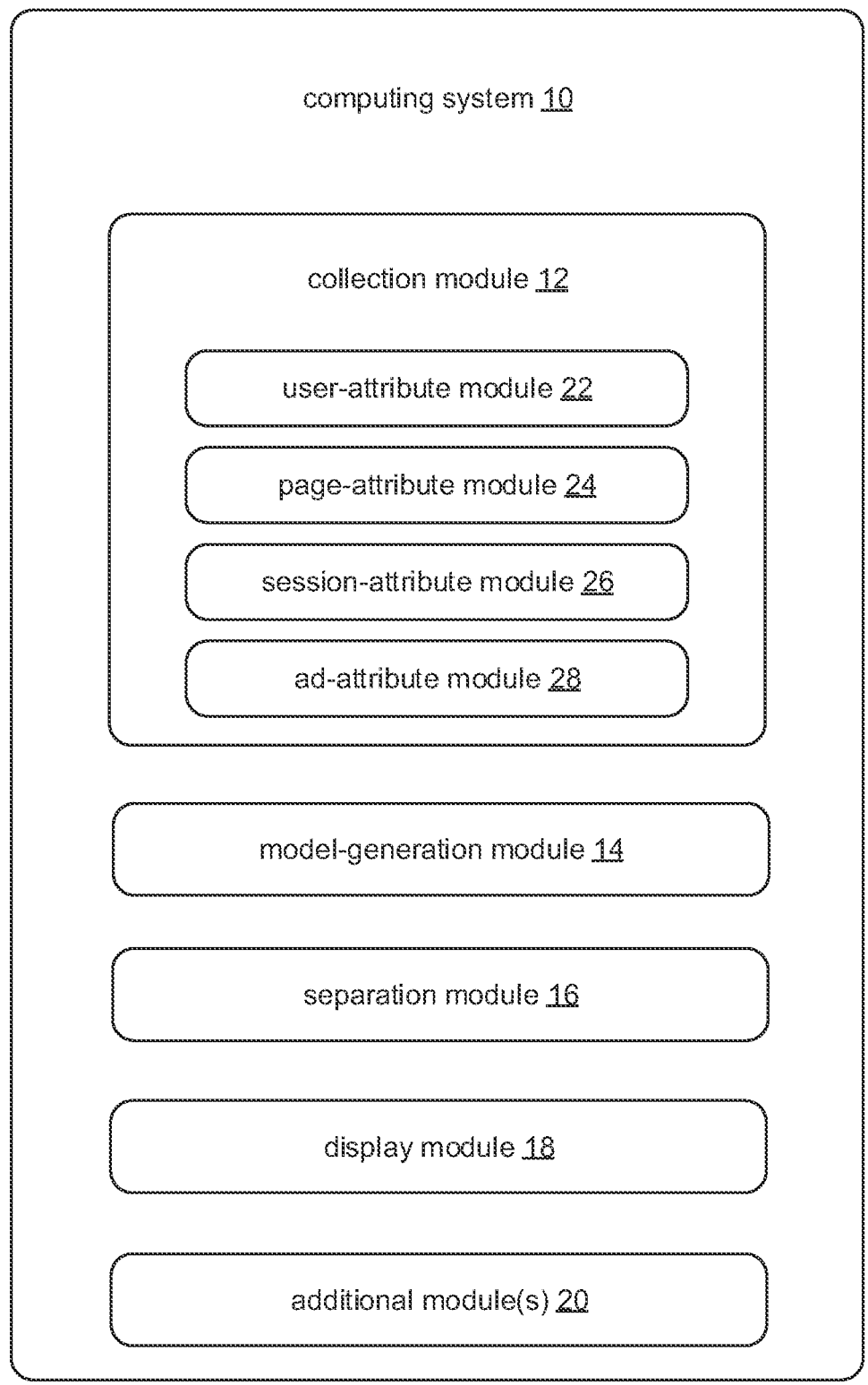
FIG. 1 is a schematic block diagram of a computing system operable to manage ad content for online display, in accordance with examples.

A number of embodiments can include a system. The system can include one or more processing modules and one or more non-transitory storage modules storing computing instructions configured to run on the one or more processing modules. The one or more storage modules can be configured to run on the one or more processing modules and perform acts of collecting training attribute values for a set of attributes from user visits of one or more users to a set of online training webpages; generating a probability model using the training attribute values, the probability model providing predicted outcomes for at least one attribute in the set of attributes; identifying, using the probability model, a first predicted outcome corresponding to a subsequent combination of attribute values collected by a collection module for a subsequent online user visit to a subsequent webpage, the predicted outcomes comprising the first predicted outcome; coordinating a first display of the subsequent webpage during the subsequent online user visit when the first predicted outcome satisfies an objective of the subsequent webpage, the first display comprising: (a) an ad at a first location on the subsequent webpage and a webpage content in a first format at a second location on the subsequent webpage; or (b) the ad at a third location on the subsequent webpage and the webpage content in a second format at a fourth location on the subsequent webpage; and coordinating a second display of an ad-free version of the subsequent webpage during the subsequent online user visit when the first predicted outcome does not satisfy the objective of the subsequent webpage.

Various embodiments include a method. The method can include collecting training attribute values for a set of attributes from user visits of one or more users to a set of online training webpages; generating a probability model using the training attribute values, the probability model providing predicted outcomes for at least one attribute in the set of attributes; identifying, using the probability model, a first predicted outcome corresponding to a subsequent combination of attribute values collected by a collection module for a subsequent online user visit to a subsequent webpage, the predicted outcomes comprising the first predicted outcome; coordinating a first display of the subsequent webpage during the subsequent online user visit when the first predicted outcome satisfies an objective of the subsequent webpage, the first display comprising: (a) an ad at a first location on the subsequent webpage and a webpage content in a first format at a second location on the subsequent webpage; or (b) the ad at a third location on the subsequent webpage and the webpage content in a second format at a fourth location on the subsequent webpage; and coordinating a second display of an ad-free version of the subsequent webpage during the subsequent online user visit when the first predicted outcome does not satisfy the objective of the subsequent webpage.

Other embodiments also include a system. The system can include one or more processors, and one or more non-transitory computer-readable media storing computing instructions configured to run on the one or more processors and perform acts of collecting training attribute values for a set of attributes; generating a probability model using the training attribute values, the probability model providing predicted outcomes for at least one attribute in the set of attributes; identifying, using the probability model, a first predicted outcome corresponding to a subsequent combination of attribute values collected by a collection module, wherein the predicted outcomes can comprise the first predicted outcome; coordinating a first display of an ad content version of a subsequent webpage when the first predicted outcome satisfies an objective of the subsequent webpage, wherein the first display can comprise: (a) an ad at a first location on the subsequent webpage and a webpage content in a first format at a second location on the subsequent webpage; or (b) the ad at a third location on the subsequent webpage and the webpage content in a second format at a fourth location on the subsequent webpage; and coordinating a second display of an ad-free version of the subsequent webpage when the first predicted outcome does not satisfy the objective of the subsequent webpage.

Further embodiment also include a method. The method can be implemented via execution of computing instructions configured to run at one or more processors and configured to be stored at non-transitory computer-readable media. The method can include collecting training attribute values for a set of attributes; generating a probability model using the training attribute values, the probability model providing predicted outcomes for at least one attribute in the set of attributes; identifying, using the probability model, a first predicted outcome corresponding to a subsequent combination of attribute values collected by a collection module, wherein the predicted outcomes can comprise the first predicted outcome; coordinating a first display of an ad content version of a subsequent webpage when the first predicted outcome satisfies an objective of the subsequent webpage, wherein the first display can comprise: (a) an ad at a first location on the subsequent webpage and a webpage content in a first format at a second location on the subsequent webpage; or (b) the ad at a third location on the subsequent webpage and the webpage content in a second format at a fourth location on the subsequent webpage; and coordinating a second display of an ad-free version of the subsequent webpage when the first predicted outcome does not satisfy the objective of the subsequent webpage.

It will be readily understood that the components of the present invention, as generally described and illustrated in the Figures herein, can be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Although displaying ad content on a webpage may add value to a webpage in terms of compensation that may be received as a result of displaying the ad content, displaying ad content on a webpage may reduce the ability of a webpage to fulfill its original purposes. For example, links in ad content may direct traffic away from a website to which the webpage pertains. Ads displayed in the ad content may be maintained internally be a website and/or may be provided by an external ad service, such as GOOGLE ADSENSE. Such external ad services may tailor ads provided to a website to match the website on which they will be displayed. In the context of e-commerce, this often means that a webpage devoted to the sale of a given category of products will display ads for competing products. As a result, the website may sell fewer products. Also, links in the ad content may increase a dropout rate, such as a bounce rate, for the webpage on which the content is displayed.

However, there may be scenarios in which ad content is unlikely to negatively impact one or more performance metrics for a webpage potentially displaying the ad content. In such scenarios, it may be advantageous to display the ad content. Maximizing the benefits for a webpage may involve balancing the potential negative impact of ad content with the potential benefits flowing from the display of such ad content. However, there may be many factors to consider in determining when an ad may be beneficial and when it may be harmful. Innovations are needed to make such determinations quickly and efficiently to maximize the value for a given webpage and/or website.

Referring to FIG. 1, a computer system 10 may provide a system for managing online ads. The computer system may include a collection module 12 operable to collect attribute values, for a set of attributes, from user visits to a set of training webpages. The collection module 12 may also collect a subsequent combination of attribute values for a subsequent visit to a subsequent webpage. The attributes for which values may be collected may characterize a webpage, a user visiting the webpage, a session established during a user visit, an ad for potential display during the visit, information relevant to performance metrics like a dropout and/or a conversion rate, and other relevant details about user visits, such as, without limitation, an ad configuration for the potential display of ad content.

The system 10 may also include a model-generation module 14 operable to generate and/or train a probability model with the attribute values from the user visits to the training webpages. The model-generation module 14 may apply one or more machine learning approaches to generate the probability model as a machine learning model. Examples of such approaches may include any number of supervised learning approaches. By way of providing examples, but not by way of limitation, such machine learning approaches may include random forest classifier, logistic regression, Bayesian classifier, and several different decision tree learning approaches. As can be appreciated, the model-generation module 14 may apply several additional machine learning and/or statistical classification approaches or combinations of such approaches to generate one or more probability models.

A resultant probability model may provide predicted outcomes for one or more performance metrics, or e-commerce attributes, such as, without limitation, a dropout rate and/or a conversion rate. Values for the one or more performance metrics and/or e-commerce attributes may be collected as values pertaining to the set of attributes for which values are collected by the collection module 12. The probability model may provide different predicted outcomes for different combination of attribute values.

In some examples, the probability model may be specific to a given ad configuration that may provide information about how and/or where ad content will be displayed with respect to the webpage/website that displays it. In certain examples, the probability model may be trained by a decision tree learning approach applied to the training attribute values for the user training visits. The resultant decision tree may comprise decision points diverging according to different attribute values and leading to different predicted outcomes for the one or more performance metrics and/or e-commerce attributes for the different combinations of attribute values. Additional non-limiting approaches may include a random forest classifier, a logistic regression, and/or a Bayesian classifier approach, among other possible machine learning approaches.

A separation module 16 may also be involved and may be operable to separate a number of user visits to the set of training webpages into a first set of user visits and a second set of user visits. The first set of user visits may visit an ad-free version of the set of training webpages. The second set of user visits may visit a version of the set of training webpages displaying ad content. The collection module 12 may be further operable to collect a first set of attribute values from the first set of user visits and a second set of attribute values from the second set of user visits. The first set of attribute values and the second set of attribute values may provide information about attributes from the set of attributes discussed above. In such examples, the model-generation module 14 may be operable to generate the probability model with the training attribute values, comprising the first set of attribute values and the second set of attribute values. The resultant probability model may, in such examples, provide predicted outcomes as differences in predicted outcomes for the one or more performance metrics and/or e-commerce attributes between the first set of user visits and the second set of user visits. Again, any number of machine learning approaches may be applied to generate a machine learning model.

Such systems may also include a display module 16 operable to identify, from the probability model, a predicted outcome for one or more performance metrics and/or e-commerce attributes. The predicted outcome identified may correspond to the subsequent combination of attribute values collected by the collection module 12 for the subsequent user visit to the subsequent webpage. The subsequent webpage may be one of the training webpages or a new webpage. The display module 16 may be further operable to display an ad on the subsequent webpage during the subsequent user visit where the predicted value is consistent with a performance objective, such as an e-commerce objective. Conversely, the display module 16 may display an ad-free version of the subsequent webpage during the subsequent user visit where the predicted value is inconsistent with the performance/e-commerce objective.

The functions involved in implementing such a computing system 10 and/or the innovations discussed herein may be handled by one or more subsets of modules. With respect to the modules discussed herein, aspects of the present invention may take the form of an entirely hardware embodiment, an entirely software embodiment (including firmware, resident software, micro-code, etc.), or an embodiment combining software and hardware aspects that may all generally be referred to herein as a "module." Furthermore, aspects of the presently discussed subject matter may take the form of a computer program product embodied in any tangible medium of expression having computer-usable program code embodied in the medium.

With respect to software aspects, any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that may contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. Aspects of a module, and possibly all of the module, that are implemented with software may be executed on a micro-processor, Central Processing Unit (CPU) and/or the like. Any hardware aspects of the module may be implemented to interact with software aspects of a module.

The computer system 10 may also include one or more additional modules 20. In some examples, the collection module 12 may include a user-attribute module 22, a page-attribute module 24, a session-attribute module 26, and/or an ad module 28. Functionalities provided by such modules are discussed in greater detail below. Before taking up the discussion, however, an environment in which the computing system 10 may be deployed is discussed.

Figure 2:
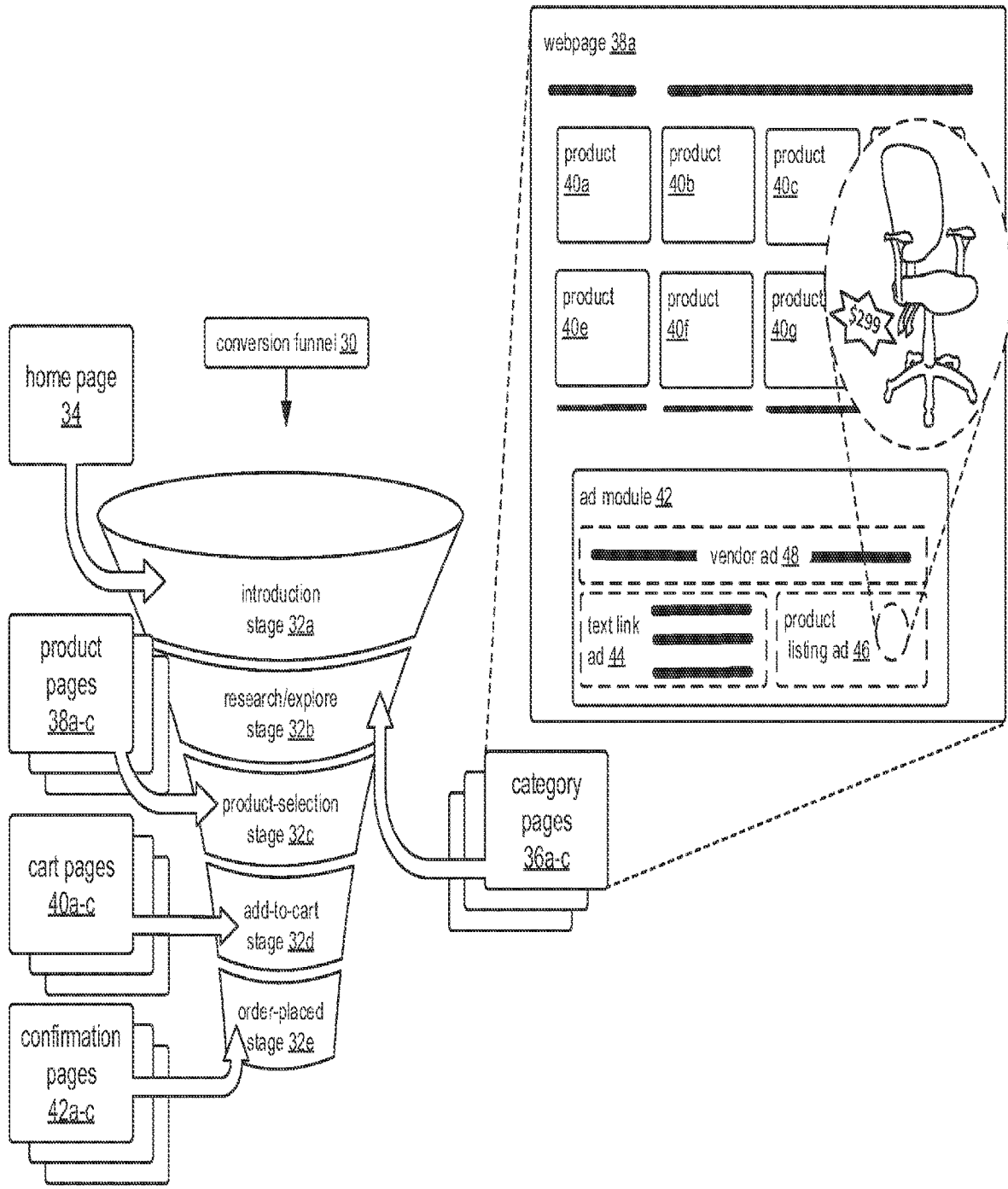
FIG. 2 is a schematic block diagram of a conversion funnel modeling a conversion process for a call to action on a website with a webpage displaying ad content, in accordance with examples.

Referring to FIG. 2, a conversion funnel model 30 is depicted. A conversion funnel model 30 may track the progression of users/visitors on a website toward completion of a call to action on the website. Although the call to action may include any number of actions, such as, without limitation, creating a user account, posting a comment, sending an email, and/or placing a phone call, in many examples, the call to action may be directly and/or implicitly to make an online purchase. In such examples, the conversion funnel model 30 may track the progression of users/visitors to the website toward the conversion of a subset of those users/visitors into purchasers.

The conversion funnel model 30 may include a number of stages 32, steps 32, or phases 32. Although the conversion funnel model 30 depicted in FIG. 2 includes five stages 32, a conversion funnel model 30 may include any number of stages 32. A conversion funnel model 30 may commence with an introduction stage 32*a*, which may be followed by a research/explore stage 32*b*. The research/explore stage 32*b* may be followed by a product stage 32*c*, which may be followed by an add-to-cart stage 32*d*. The add-to-cart stage 32*d* may be followed by an order-placed stage 32*e*. Different websites may have different types of stages 32 than those depicted tailored to suit their various objectives.

Various webpages 34-42 pertaining to be a website may be categorized according to various categories. Five different types, or categories, of webpages are depicted in FIG. 2. However, different numbers of categories and/or different categories are possible. A website may include a home page 34 making up a category. Various category pages 36*a*-*c* may make up another category. An additional category may be made up of product pages 38*a*-*c*. Cart pages 40*a*-*c* may make up another category. Yet another category may be made up of confirmation pages 42*a*-*c*. In some examples, a webpage may pertain to more than one category 34-42.

To aid in understanding the potential impact, on one or more performance metrics, of ad content being displayed on a webpage, one or more categories 34-42 to which a webpage may belong may be linked to one or more stages 32 in the conversion funnel model 30. By way of a non-limiting example, the introduction stage 32*a* may provide a starting point to explore a website and/or products offered thereon. Therefore, a homepage 34 may provide one non-limiting example of a webpage that may be correlated to an introduction stage 32*a*. Depending on the example, the home page 34 may or may not be correlated with one or more additional stages 32*b*-*e*.

Not all of the users/visitors arriving at the home page 34 and/or introduction stage 32*a* will progress down the conversion funnel 30. A certain percentage of visits from the introduction stage 32*a* may not proceed to the research/explore stage 32*b*, resulting in a narrowing of the conversion funnel 30. The narrowing of the conversion funnel 30 may be measured with one or more dropout rates, such as one or more bounce rates, for one or more webpages that may pertain to the introduction stage 32*a*.

Users/visitors may progress to the research/explore stage 32*b* may progress from the introduction stage 32*a*, by way of example and not limitation, by clicking on one or more links from one or more webpages 34 to a webpage 36*a*-*c* correlated to the research/explore stage 32*b* and/or engaging in one or more searches that result in one or more webpages 36*a*-*c*. Some visitors may arrive at one or more webpages 36*a*-*c* pertaining to the research/explore stage 32*b*, and/or more webpages 38*a*-*c*, 40*a*-*c*, 42*a*-*c* pertaining to other stages 32*b*-*e* without engaging the introduction stage 32*a* and/or some other proceeding stage 32*b*-*d*. In such scenarios, the first webpages 34-42 with which a visitor may engage may serve as landing pages 36*a*-*c* from external links from, by way of non-limiting examples, a search engine and/or and affiliated page.

The research/explore stage 32*b* may provide content pertinent to a given classification type for content provided at the website. By way of a non-limiting example, the research/explore stage 32*b* may provide a list of blog posts pertaining to a given subject. By way of another non-limiting example, in the context of e-commerce, the research/explore stage 32*b* may provide a list of information about products belonging to a given category, such as refrigerators, televisions, or girls' bikes. One or more category pages 36*a*-*c* may be correlated with the research/explore stage 32*b*. Search pages, which may return links to content on the website related to a search entered into a search tool on the website or a browse engine may provide an additional example of a category of webpages that may be correlated to the research/explore stage 32*b*. Browse pages that may allow a user to acquire an overview of the content on a website may provide yet another example.

As with the transition from the introduction stage 32*a* to the research/explore stage 32*b*, a dropout rate between the research/explore stage 32*b* and the product selection stage 32*c* may further narrow the conversion funnel 30. The product selection stage 32*c* may provide the actual content for a particular offering of the website. For example, a blog post may be provided. In the context of e-commerce, additional information about a particular product offering selected by a visitor may be displayed. Therefore, one example of a category of webpages that may be correlated to the product selection stage 32*c* may be made up of one or more product pages 38*a*-*c*. The product selection stage 32*c* may also allow a visitor to add the product to the visitor's cart.

An additional dropout rate may further narrow the conversion funnel 30 during the transition from the product selection stage 32*c* to the ad-to-cart stage 32*d*. The ad-to-cart stage 32*d* may provide a framework to facilitate a response to a call to action. For example, an email response may be facilitated for a call to action involving an invitation for an inquiry. In the context of e-commerce, an electronic shopping cart may be provided that may allow a visitor to view items added to the visitor's electronic shopping cart and/or begin to place an order. One or more cart pages 40*a*-*c* may be correlated to the ad-to-cart stage 32*d*.

The conversion funnel 30 may conclude at the order-placed stage 32*e* after a further narrowing of the conversion funnel 30. At this point, the conversion process may be complete, the call to action may be responded to and/or a purchase may have been made. Consequently, one or more confirmation pages 42*a*-*c* may make up a category of webpages that may be correlated to the order-placed stage 32*e*. Ad content may be displayed at one or more of these stages 32 over one or more web pages 34-42.

For example, a category webpage 38*a* may list various products 40*a*-*h* of various makes and/or models. For example, the webpage 38*a* may list various makes and models of chairs. In addition, the webpage 38*a* may include an ad module 42 operable to display ad content. Non-limiting examples of the ad content may include one or more text links 44. The ad content may also include one or more product listing ads 46. As an additional non-limiting example, the ad content may include one or more vendor ads 48, or links to products sold by different vendors within the website.

The ad content may be from a third party. In some examples, the ad content may be provided by an external ad service, such as, without limitation, GOOGLE ADSENSE, which may act as a broker between the website and the third party. Since the external ad service and/or website may earn revenue based on the amount of traffic the ad content drives and/or the amount of revenue it generates to the third party sites, the external ad service may tailor the ad content to the webpage 38*a* for which it may be provided. As depicted in FIG. 2, the ad content may be contextualized such that the subject of the ad, an office chair in FIG. 2, matches and/or relates to the content of the webpage 38*a*, i.e., different makes and/or models of office chairs.

Conversely, in some examples, an inventory of ads and/or ad content may be maintained internally, by a website. In such examples, third-party sites may be allowed to bid for ad placements. Where the inventory of ads and/or ad content is maintained internally, the contextual matching of ads to a webpage may also be performed by an in-house system.

However, as discussed, such contextualized ads may enhance an already present risk to objectives of the webpage 38a posed by the display of the ad content in the first place. Ad content may pose a risk to objectives such as fostering additional interaction with additional webpages on the website, progressing down the conversion funnel 30, and/or making a sale. Preventing ad content from detracting from the experience of a user/visitor, negatively impacting revenue, reducing conversions, increasing dropout rates and resulting in other undesirable outcomes, while maintaining the benefits of the revenue that ad content may produce presents a problem with many variables.

The classification of a webpage on which ad content may be displayed, and/or a stage 32 to which the webpage may correlate, provides at least one variable that may alter probabilities as to whether the ad content will detract from further desirable interactions, or simply provide revenue for visitors unlikely to further engage a website in significant ways. For example, a conversion rate may be more likely to experience a negative impact where ad content is displayed on a cart page 40 than a home page 34. Presenting an alternative product from a competitor to someone who has progressed all the way down the conversion funnel 30, as can be appreciated, may be more likely to negatively affect a conversion rate than presenting the same content to visitors to a home page 34, which are more likely to be casually engaged with a website and apt to drift away. Such variables may operate in isolation or in concert with other variables, some of which may also have to do with the manner in which the ad content is displayed.

Figure 3:
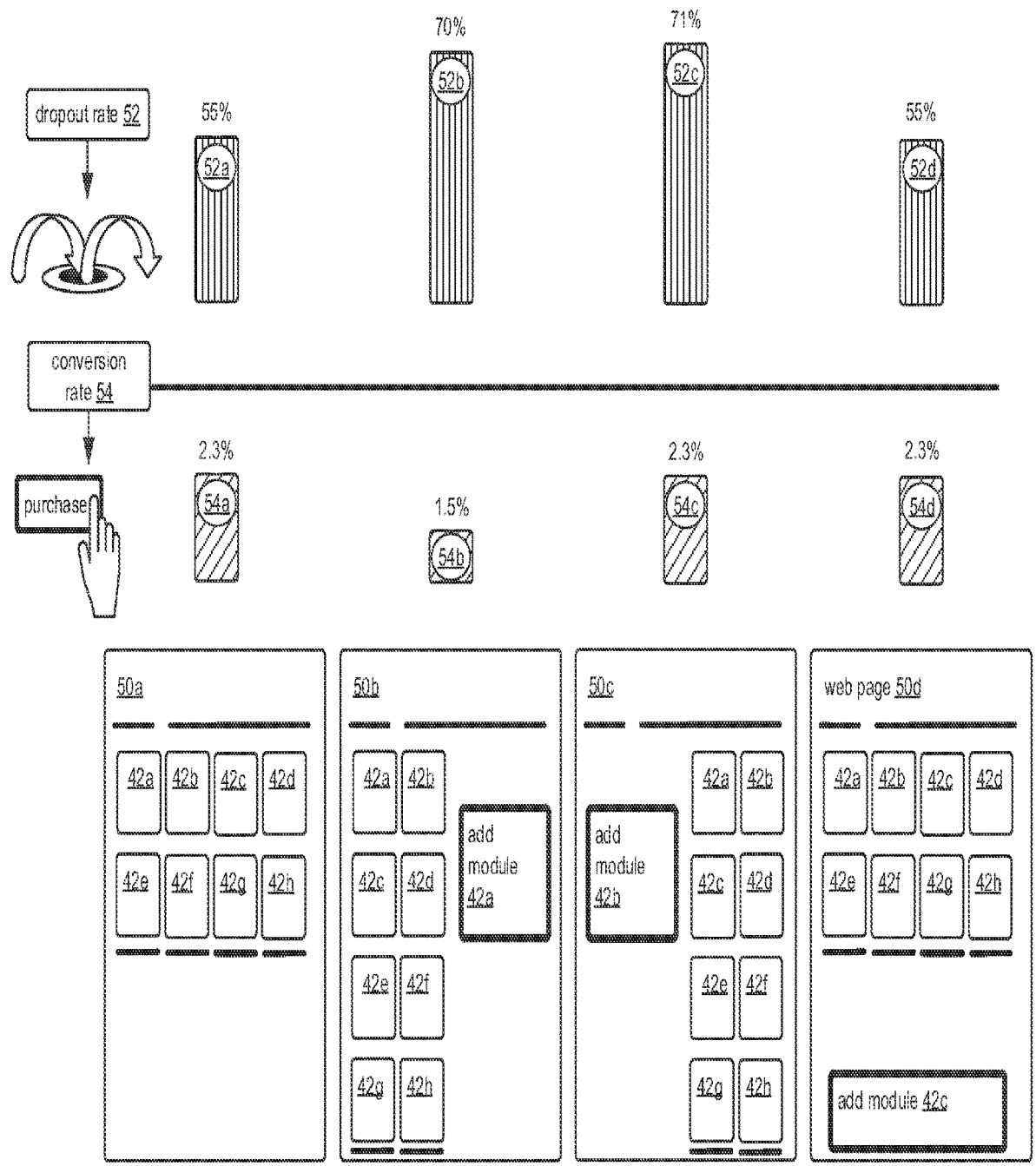
FIG. 3 is a schematic block diagram comparing dropout rates and conversion rates for a webpage without ad content to various ad configurations for the webpage displaying ad content, in accordance with examples.

Referring to FIG. 3, an ad-free configuration 50a of the webpage 38a from the previous figure is depicted together with different ad configurations 50b-d for the webpage 38a. Different potential performance metrics, e-commerce attributes, or response variables are depicted, in terms of both dropout rates 52 and conversion rates 54, for the ad-free version displayed without ad content 50a and the various ad-configurations 50b-d of the webpage 38a. As can be appreciated, the presence of ad content may change a corresponding dropout rate 52, such as a bounce rate, and/or a conversion rate 54.

The ad-free version 50a, for example, may have a bounce rate 52a of 55%. Similarly, the conversion rate 54a for the ad-free version 50a may be at 2.3%. Although the conversion process may not be completed at the research/explore stage 32b on a category page 38a similar to the one depicted, the eventual outcome in terms of a conversion, or lack thereof, for a user/visitor's interactions with a website and who also happens to visit the category page 38a may also be indexed to the category page 38a.

However, the bounce rate 52 may jump to 70% where an ad module 42a for the webpage 38a is operable to display ad content consistent with an ad configuration 50b that displays an ad on the right side of the webpage 38a. Additionally, the conversion rate 54b for this ad configuration 50b may drop to 1.5%. These two changes may suggest that displaying ad content consistent with the second configuration 50b, on the right side, may not be worth the tradeoff, or at least for this particular webpage 38a, category of pages in general, and/or webpages associated with this stage 32b. However, data may also be collected about revenue generated for the ad content when displayed on the webpage 38a consistent with the second ad configuration 50b to confirm that the tradeoff involved in displaying ad content in this ad configuration may not be worthwhile.

A third ad configuration 50c may involve an add module 42b that displays ad content on the left side of the webpage 38b. The third ad configuration 50c may have no effect on the conversion rate 54c, which may continue at 2.3%, as it was with the ad-free version 50a. The third ad configuration 50c may, however, have a significant impact on the bounce rate 52c, which may increase from 55% to 71%. In some examples, the conversion rate 54 may be the focal point of a determination about whether to display ad content consistent with the third ad configuration 50c, making the increased bounce rate 54c less relevant, or irrelevant. In such scenarios, any additional marketing, brand recognition, or other intangibles associated with additional, but conversion-free interactions, with the website may be deemed of less importance than revenue associated with the ad content.

A fourth ad configuration 50d may involve an ad module 42c that may display ad content at the bottom of the webpage 38a. Such an ad configuration 50d may have no impact on the conversion rate 54d, which may stay at 2.3%. Additionally, this fourth ad configuration 50d may have little impact on the bounce rate 52a, which may increase from 55% to 56%. A determination may be made that revenue from ad content displayed consistent with the fourth ad configuration 54d may be worth the slight increase in the bounce rate 52d. Conversely, a determination may be made that no increases are tolerable.

The basic ad configurations 50b-d depicted in FIG. 3 are not intended to be limiting. Additional location, dimensions, and/or other properties are possible. For example, instead of simply displaying an ad at the bottom of a webpage, an ad configuration 50 may call for the placement of an ad in relation to a percentage of how far down the webpage a user scrolls.

As demonstrated in FIG. 3, an ad configuration 50 may result in: (1) an increase in the dropout/bounce rate 52 at a particular stage 32 in the conversion funnel 30 and a corresponding decrease in the conversion rate 54, or number of orders placed; (2) an increase in the dropout/bounce rate 52 at the particular stage 32 without a change in the conversion rate 54; or (3) no change in the dropout/bounce rate 52 and no change in the conversion rate 54. As can be appreciated, the first scenario may be the least desirable. The second scenario may arise where placing ad content at one stage 32 simply moves the stage 32, at which dropouts/bounces that would occur anyway, occur. The third scenario may be the most desirable.

However, business requirements consistent with any of these scenarios and/or other scenarios may inform determinations about stages 32 and/or ad configurations 50 for which the display of ad content may be tolerable or desirable. For example, additional, or alternative performance metrics, e-commerce attributes, or response variables may be considered. Non-limiting examples may include a Product View Rate (PRV), traffic (or number of visits), and/or Revenue Per one-thousand iMpressions (RPM).

To enhance the relationship between webpages and the display of ad content thereon, innovations may be employed. Such innovations may address the complexities of signals that may be indicative of the impact of displaying ad content on a given webpage. Such complexities may involve elements from the foregoing discussion of the conversion model 30, stages 32 therein, webpage categories, and ad configurations 50, among many other considerations to be discussed below. As can be appreciated, such complexities may be particularly large for large websites, such as large e-commerce websites that may receive many visitors.

Figure 4:
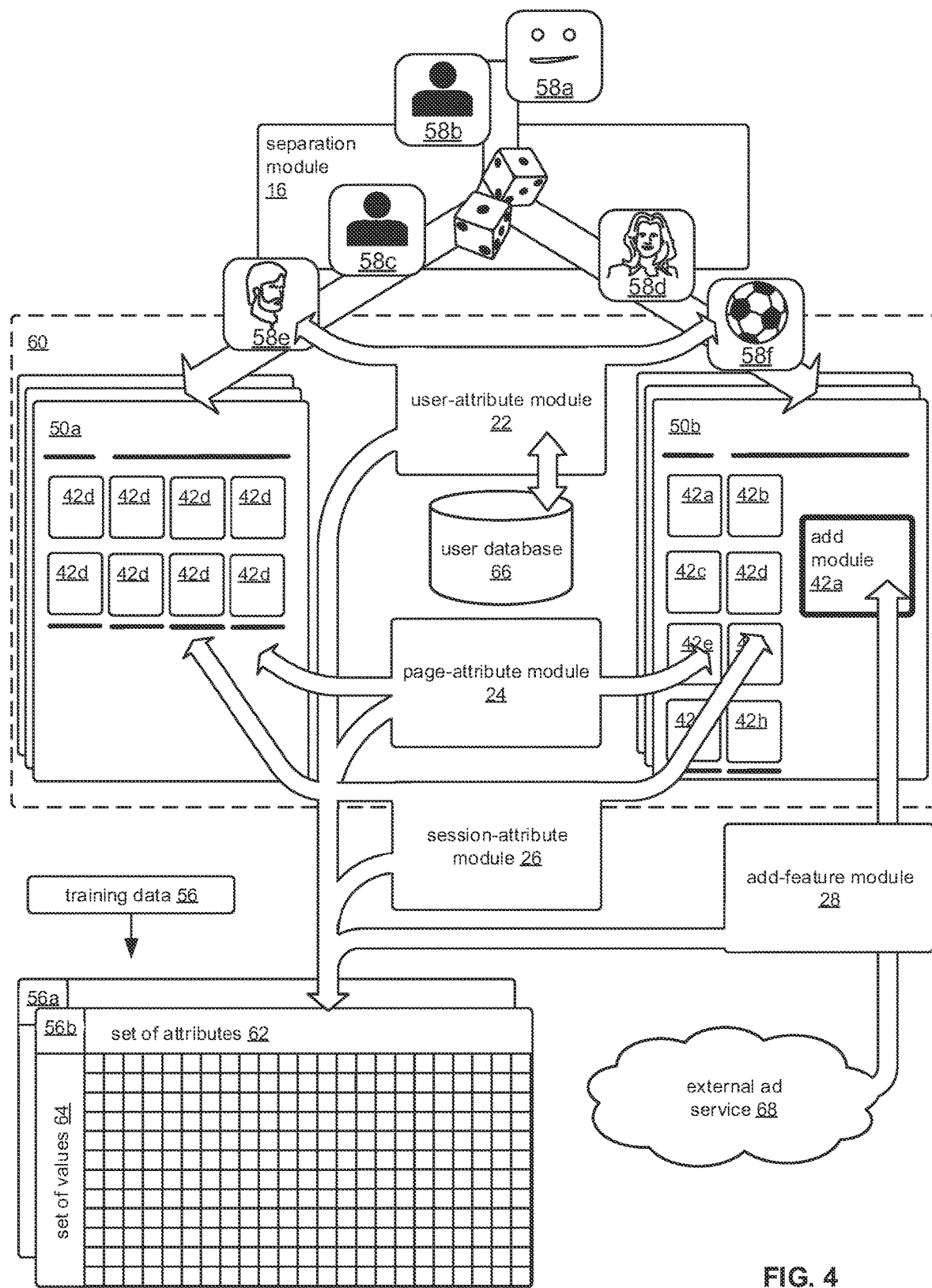
FIG. 4 is a schematic block diagram of a separation module operable to separate user training visits between a version of a webpage without ad content and a version displaying ad content, together with various modules that may be used to collect various values for attributes characterizing aspects of the user training visits, in accordance with examples.

Referring to FIG. 4, elements of a computer system 10 are depicted that may be capable of playing roles in automatically learning from user/visitor behavior on a website in light of potential ad content. Such a computer system 10 may be operable to dynamically decide whether to place ad content on an individual webpage, what kind of ad content, and/or where the ad content might be displayed, among other considerations for individual user visits. Such a computer system 10 may make such decisions to prevent, or mitigate, damage to objectives for the website, such as maintaining user experience, revenue, and/or conversions.

The collection module 12, introduced above, may be operable to collect training data 56 that may be used to generate one or more probability models to facilitate the making of decisions about the potential inclusion and/or exclusion of ad content. The training data 56 may come from user visits 58. In some examples, a separation module 16, may be operable to separate user training visits 58a-f to a set of training webpages 60 into a first set of user visits 56c,e and a second set of user visits 56d,f. As used herein, the term set may refer to a set with any number of elements, from a null set, to a set with a single element, to a set with a large number of elements. Determinations about which user visits 58 to include in which set of user visits may be made randomly and/or with the aid of one or more sorting routines.

The separation module 16 may direct the first set of user visits 56c,e to an ad-free version 50a of the set of training webpages 60 displayed without ad content during the first set of user visits 58c,e. Conversely, the separation module 16 may direct the second set of user visits 58d,f to a version of the set of training webpages 60 displaying ad content consistent with an ad configuration 50b. In such examples, the collection module 12 may be operable to collect a first training data set 56a from the first set of user visits 58c,e and a second training data set 56b from the second set of user visits 58d,f.

Figure 5:
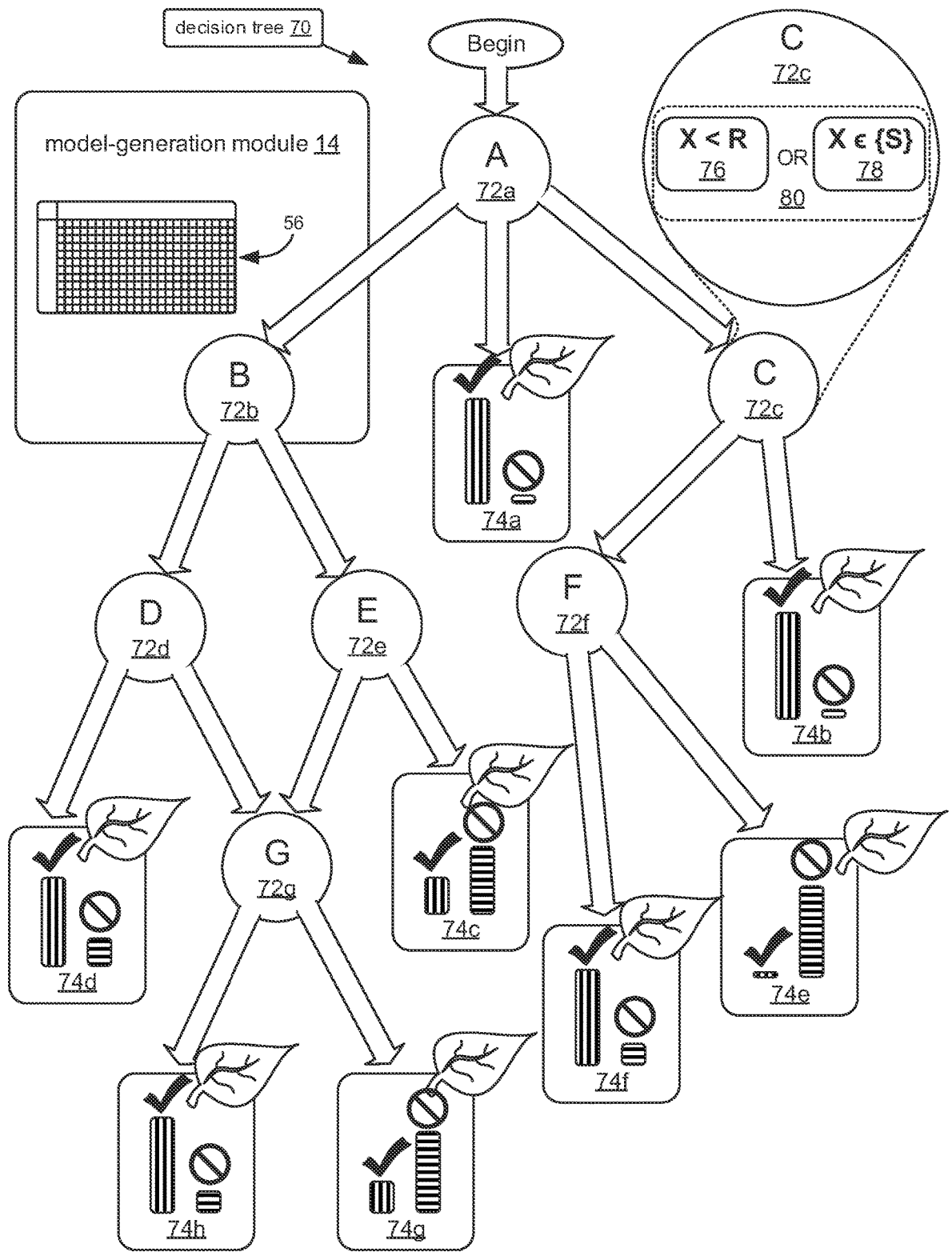
FIG. 5 is a schematic block diagram of a probability model comprising a decision tree trained with attribute values from user training visits to a webpage, the decision tree providing different predicted outcomes with respect to a performance metric for different combinations of attribute values, in accordance with examples.

Training data 56 from user visits 58 may be correlated to a user visit to a webpage in the set of training webpages 60 for at least a portion of a set of attributes 62 that characterize the user visits. In FIG. 5, attributes in the set of attributes 62 are depicted as columns in training data 56 tables. Values and/or data for a set of user visits 64, which are depicted as rows in the training data 56 tables, may be considered as elements in those training data 56 tables, individual values, or data elements, being correlated to individual attributes in the set of attributes 62 and individual instances of user visits 58 in the set of user visits 64.

As can be appreciated, alternative data structures for training data/values 56 are possible. User visits 58 may be characterized in terms of the users visiting webpages, sessions established during those visits, the webpages being visited, ad content potentially displayed thereon, performance metrics, and/or other information. Different modules may be provided with the collection module 12 to collect attribute values, recorded values and/or data 56 for different types of attributes from the set of attributes 62.

For example, a user-attribute module 22, which may or may not be provided within the control module 12, may be provided to collect data/values 56 for attributes in the set of attributes 62 related to users visiting a given webpage. The user-attribute module 22 may be operable to identify a user for a user visit 58 to the webpage during the user visit 58. Such a webpage may belong to a website of interest. The user may have engaged in an authentication and/or identification process on the webpage, or elsewhere on a website to which the webpage may belong. To identify a user, the user-attribute module 22 may acquire information, by way of example and not limitation, during an authentication and/or login process. Such processes may extend, for example, to a third-party service providing digital identification information, such as according to an open standard.

The user-attribute module 22 may be further operable to collect one or more values about the user. The collected values may pertain to one or more user attributes belonging to the set of attributes 62 for which values are collected. Some non-limiting examples of such user-level attributes, or features, may include a user's preferences, a user's purchase history, a user's geographical information, whether the user is logged in, and/or a social status for the user (as may be provided by social media sources such as FACEBOOK or TWITTER), among other possibilities.

In such examples, the user-attribute module 22 may access and/or derive attribute values/data for one or more user attributes from information about and/or indexed to the user stored in a user database 66. Such values may be included in the training data 56, whether generally or in terms of the first training data set 56a, the second training data set 56b, other training data sets 56 and/or other data sets. The information may include, without limitation, a record of interaction between the user and the webpage and/or website to which the webpage may belong. By way of non-limiting examples, the information may be about particular webpages accessed, the time spent on one or more webpages, files accessed, e-commerce transactions, and/or queries and/or responses, among other potential information about a user's actions relative to the webpage and/or website. The user-attribute module 22 may provide one or more values to the attribute values collected by the collection module 12.

Some examples may include a page-attribute module 24, which may or may not be provided within the control module 12. The page-attribute module 24 may be operable to collect, about the webpage being visited, one or more values pertaining to one or more page attributes from the set of attributes 62. The page-attribute module 64 may provide, to the attribute values collected by the collection module 12 the one or more values for the one or more page attributes for the webpage visited during the user visit.

Page attributes, or page-level features, may include higher level information from clickstream data that may provide information about outcomes relative to the overall website to which the webpage belongs. Non-limiting examples of page attributes may include: a number of visits to the webpage, e.g., traffic; a PVR, such as a click through rate to a product webpage; and/or a dropout rate, such as a bounce rate from the webpage. Additional non-limiting examples may include a conversion rate, such as an RPM.

Acquisition of values for some of such attributes may involve the construction of a visit chain of webpages visited by the user during a relevant user visit to the website that includes the webpage. Additionally, page attributes may include page context features, such as, without limitation, keyword density, product titles, facets, descriptions, and/or product relevance. Furthermore, the page-attribute module 24 may be operable to provide, to the attribute values collected by the collection module 12, values for page attributes for the relevant webpage visited during the user visit.

A session-attribute module 26, which may or may not be provided within the control module 12, may be operable to collect one or more values for one or more session attributes that may pertain to the set of attributes 62 discussed above. A non-limiting example of session attributes may include item availability on an e-commerce webpage for a session established during the user visit. A price of a product during the user visit provides another potential example. An additional non-limiting example may include a price difference between the price for a product on the website and the price on one or more competitor websites during the user visit. The session-attribute module 26 may be operable to provide one or more values for one or more session attributes for a session established during the user visit at the webpage to the attribute values collected by the collection module 12.

An ad-attribute module 28 may be provided, which may or may not be provided within the control module 12. The ad-attribute module 28 may be operable to receive an ad from an external ad service 68 for potential display in the ad content. The ad-attribute module 28 may also be operable to analyze and/or collect one or more values for one or more ad attributes that may pertain to the set of attributes. By way of providing examples and not by way of limitation, exemplary ad attributes may include an ad type. Non-limiting examples of ad types may include plain text, text links, product text, product images, product listings, product links, product animations, product videos, vendor links, vendor text, vendor animations, and/or vendor videos, among other types.

Other examples of ad-attributes may be an ad location and/or one or more ad dimensions. Non-limiting examples of ad locations may include in a header, in a footer, in a left sidebar and/or in a right sidebar. Additional examples of ad attributes may include ad context. Non-limiting examples of ad context may include keywords, sponsorships, and/or brand names, among others. Yet another non-limiting example of ad attributes may include ad revenue. Non-limiting examples of ad revenue may include revenue per click and/or revenue per impression, among others.

In some examples, an ad attribute in the set of attributes 62 may include a webpage category and/or a characterization of a webpage with respect to a stage 32 in the conversion funnel 30 for a website to which the webpage visited during the user visit may belong. In certain examples, an ad configuration 50 may constitute, be described by, and/or be derivable from one or more ad attribute values. The ad-module 28 may provide, to the attribute values collected by the collection module 12, one or more values for one or more ad attributes for the received ad.

The collection module 12, user-attribute module 22, page-attribute module 24, session-attribute module 26, and/or ad module 28 may be operable to collect values, attribute values, data, and/or data sets, such as potentially the first training data set 56a and/or the second data training set 56b, not only for training user visits, but for one or more subsequent data sets and/or values for one or more subsequent, or additional, user visits to one or more subsequent webpages. A subsequent webpage may be a training webpage or a new webpage for which values and/or data have not been collected for purposes of generating a probability model. Such an additional, or subsequent data set, may include values for attributes in the set of attributes 62 of any of the forgoing possibilities, among others.

Speaking of the collected training data 56, such as the first training data set 56a and/or the second data training set 56b, and not a subsequent, or additional data set, the training data may be used by a model-generating module 14 to train and/or generate one or more probability models. Such probability models may predict outcomes for one or more e-commerce attributes, response variables, and/or performance metrics. Additional discussion of potential examples of such probability models and/or their training and/or generation are provided below.

Referring to FIG. 5, a model-generation module 14 is depicted. In examples consistent with FIG. 5, the model-generation module 14 may be operable to engage in decision tree learning on the training data 56 to train a decision tree 70. As can be appreciated, not all probability models consistent with the innovations discussed herein need be decision trees.

The model-generation module 14 may apply one or more machine learning approaches on training data 56 to create a probability model. Such machine learning approaches may include any number of supervised learning approaches. Non-limiting examples may include a random forest classifier approach, a logistic regression approach, a Bayesian classifier approaches, and/or one or more of several different decision tree learning approaches. Several different statistical classification approaches may be applied to the training data 56 to generate one or more probability models.

Where decision tree learning is applied it may be applied on numeric and/or categorical data. Decision tree learning may rely on, without limitation, one or more algorithms, such as versions of greedy, linear regression, and/or random forest algorithms. Application of one or more of these approaches may determine the nodes 72, the relationships between the nodes 72, and/or the decisions to be made at the nodes 72 between branches to enhance the predictions at the leaves 74. The insensitivity to the range of features of a decision tree 70, may be leveraged in such probability models, which may also be applicable for classification and/or regression tasks.

A probability model, and/or decision tree 70, may be trained with an objective in mind, such as a business goal. To achieve such an objective, or business goal, one or more response variables, e-commerce attributes, and/or performance metrics may be chosen for which the probability model may predict outcomes. In some examples, the one or more response variables, e-commerce attributes, and/or performance metrics may comprise one or more attributes in the set of attributes 62. Non-limiting examples of response variables, e-commerce attributes, and/or performance metrics may include one or more conversion rates 54, dropout rates 52, bounce rates, RPMs, and/or PVRs, among other possibilities.

By way of non-limiting examples, a probability model, or decision tree 70, may be trained consistent with an objective, or business goal, to keep the conversion rate from dropping, by training the probability model to predict outcomes in terms of RPM. To keep dropout/bounce rates 52 at one or more stages 32 in a conversion funnel 30 from increasing, consistent with another objective, a PVR may be selected as the response variable, or selected for inclusion in the response variable, for which outcomes may be predicted.

In some examples, the decision tree learning may take place on both the first training data set 56a and the second training data set 56. In such examples, the prediction model, and/or decision tree 70, may predict outcomes or results for a difference in the one or more response variables, e-commerce attributes, and/or performance metrics between versions of the set of training webpages 60 displaying the ad content and displayed without the ad content.

In some examples, the decision tree 70 may be generated with nodes 72 defined by different values for attributes in the set of attributes 62 and leaves 74 predicting values for a change in at least one response variable. Such a model may lend itself to interpretation in terms of the decisions required at each node 72. Decisions at individual nodes 72 may be based on quantitative comparisons 76, qualitative classifications 78, and or Boolean combinations 80 of one or more quantitative comparisons 76 and/or one or more qualitative classifications 78.

Although only seven nodes 72a-g are depicted in FIG. 5, any number of nodes 72 may be included in a decision tree 70. Paths, or branches, may extend from the first node 72a to additional nodes 72b, 72c. Although examples in FIG. 5 depict instances with two and three branches extending from a given node 72, any number of branches are possible. Additional paths may in turn extend to yet more nodes 72 until a leaf 74 is eventually reached. Although only seven leaves 74a-g are depicted in FIG. 5, any number of leaves may be included in a decision tree 70.

A leaf 74 in a decision tree 70 may predict an outcome and/or result for the one or more response variables, e-commerce attributes, performance metrics and/or one or more differences between one of the foregoing, or some combination thereof, with respect to versions of the set of training webpages 60 without ad content and with ad content. In some examples, these predictions may be provided in the form of one or more probability distributions and/or probability densities. In some examples, the leaves 74 may simply report a binary probability as to whether the display of ad content will or will not negatively impact one or more objectives, as depicted by the histograms in the leaves 74a-g in FIG. 5.

In the histograms, the bars with vertical cross-hatching and a check mark are indicative of a probability that the display of an ad checks out without an overly significant negative impact on the one or more objectives. The bars with horizontal cross-hatching and a circle with a bar are indicative of a probability that the one or more objectives will be significantly and negatively impacted. In some leaves 74a, b,d,f,h, the probability that the display checks out is greater than that it does not. In other leaves 74c,e,g, the probability of significant negative impacts is greater. As can be appreciated, such probability models may be useful in deciding whether to display ad content.

Figure 6:
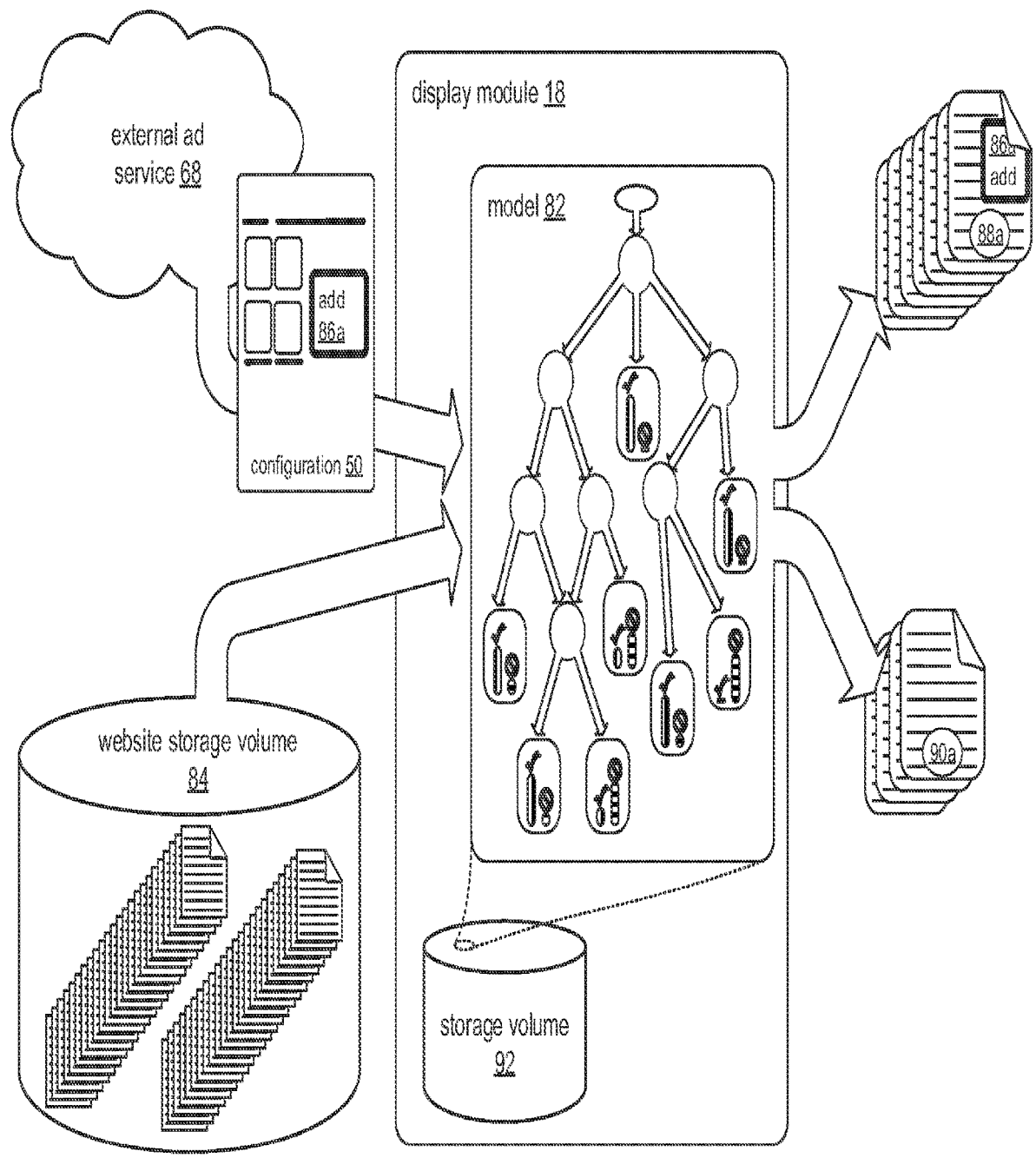
FIG. 6 is a schematic block diagram of a display module operable to apply a probability model for an ad configuration to webpages corresponding to a website to determine on which webpages ad content may be displayed consistent with performance objectives for the webpages and/or website, in accordance with examples.

Referring to FIG. 6, a display module 18 is depicted. As discussed previously, one or more subsequent and/or additional visits to one or more subsequent/additional webpages may result in one or more subsequent/additional/decision data sets, or subsequent combinations of attribute values, collected by modules discussed above. The display module 18 may be operable to apply a probability model 82 to determine on which of such subsequent/additional webpages and for which of such subsequent/additional user visits ad content may be displayed and/or how. In response to such a subsequent user visit, the subsequently visited webpage may be retrieved from a website storage volume 84. The subsequent/additional data set, or subsequent combinations of attribute values, may be collected.

The display module 18 may be operable to identify a predicted probability outcome or result corresponding to the subsequent/additional/decision data set, or subsequent combination of attribute values. In examples in which the probability module 82 is a decision tree 70, this may be accomplished by traversing the decision tree 70 and selecting, at each node 72 presented, a branch in accordance with the subsequent/additional/decision data set, or the like. Therefore, the decision tree 70 may provide a conditional probability distribution for different outcomes with respect to one or more response, or target variables. Such a conditional probability distribution may be conditioned upon the various nodes 72 and/or paths traversed in arriving at a particular leaf 74 which the display module 18 may identify as providing the relevant probability outcome or result.

The display module 18 may be further operable to display the subject webpage with the ad content 90 during the additional user visit where the predicted result, such as for a predicted change associated with displaying the ad content, is consistent with one or more business objectives. Conversely, the display module 18 may be operable to display the subject webpage without the ad content 92 during the additional user visit where the at least one predicted result is inconsistent with the one or more business objectives. The ad content may include an ad 86a supplied by an external ad service 68.

In some examples, the external ad service 68 may tailor the ad to the relevant webpage, increasing the utility of using a probability model 82. The external ad service 68 may also supply an ad configuration 50. In other examples, the computing system 10 may select an ad configuration 50. Some examples may generate different models 82 for different ad configurations 50, webpage categories, and or conversion funnel 30 stages 32. In an alternative, this information may be handled in terms of attributes in the set of attributes 62.

Certain examples may include a storage volume 92 for one or more probability models 82. In such examples, the model-generation module 18 may be operable to select a given ad configuration 50 corresponding to a probability model 82 with a favorable predicted outcome from multiple probability models 82 in the storage volume 92. Additional architecture is discussed below.

Figure 7:
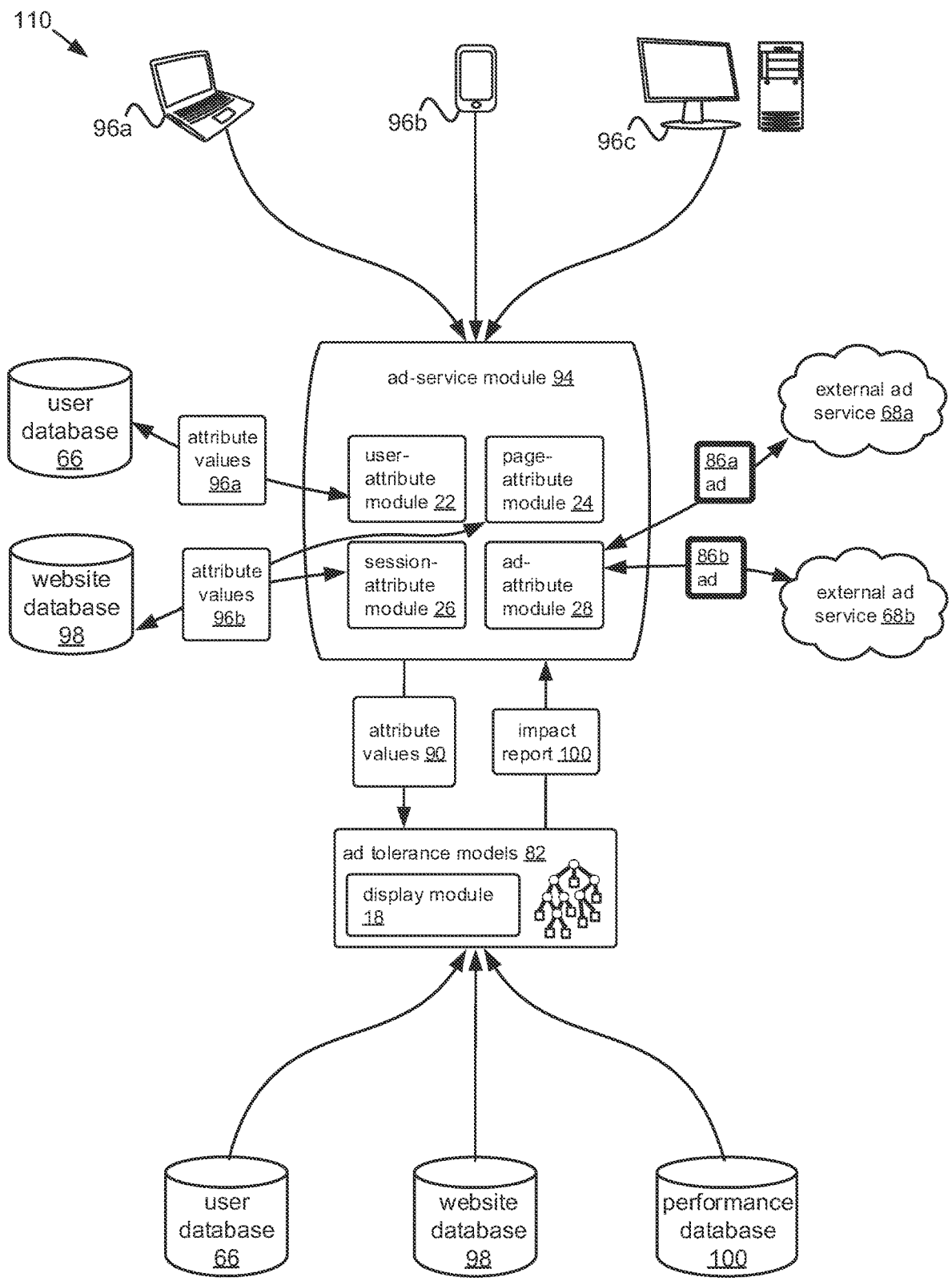
FIG. 7 is a schematic block diagram of an architecture for a computing system operable to manage ad content for online display, in accordance with examples.

Referring to FIG. 7, architecture for a computing system 10 is depicted that is operable to manage ad content for online display in accordance with examples. The architecture may include an ad-service module 94 that may be operable coordinate activities for displaying on-line ads consistent with a business objective in response to requests for webpages from a website from client computing devices 96. Examples of such client computing devices 96 may include, without limitation: laptops 96a; mobile devices 96b, such as mobile phones, tablets, personal digital assistants, wearable devices, and the like; and/or desktop computers 96c.

The ad-service module 94 may be provided with a user-attribute module 22, a page-attribute module 24, a session-attribute module 26, an ad-attribute module 28, and/or collection module 12 to collect additional/subsequent/decision data sets. These modules may be the same modules used to collect training data and/or secondary instances of these modules, both instance of such pairs of modules may be referred to as the same module. The user a user-attribute module 22 may acquire user attribute values 96a from a user database 66. The page-attribute module 24 and/or a session-attribute module 26 may acquire page/session attribute values 96b from a website database 88, which may include clickstream data, order data, and more, for a requested webpage and a corresponding user visit 58.

The ad-service module 94 may also coordinate with one or more external ad services 68 to acquire ads 86. An ad-attribute module 28 may be operable to collect ad-attribute values for these ads 86. The ad-service module 94 may utilize a display module 18 to receive an impact report 100 for potential ad content and/or one or more ad configurations 50. The impact report 100 may include information about one or more performance metrics, such as, without limitation, a RPM and/or a PVR. In some examples, the impact report 100 may comprise a decision as to whether or not to display ad content and/or according to which ad configuration 50.

The display module 18 may generate an impact report 100 based on one or more ad-tolerance models 82. The ad-tolerance models may be generated from training data/attribute values from the user database 66 and/or the website database 98. Additionally, the ad-tolerance models may be generated with values/data from a performance database with information about performance metrics in a performance database 100.

Figure 8:
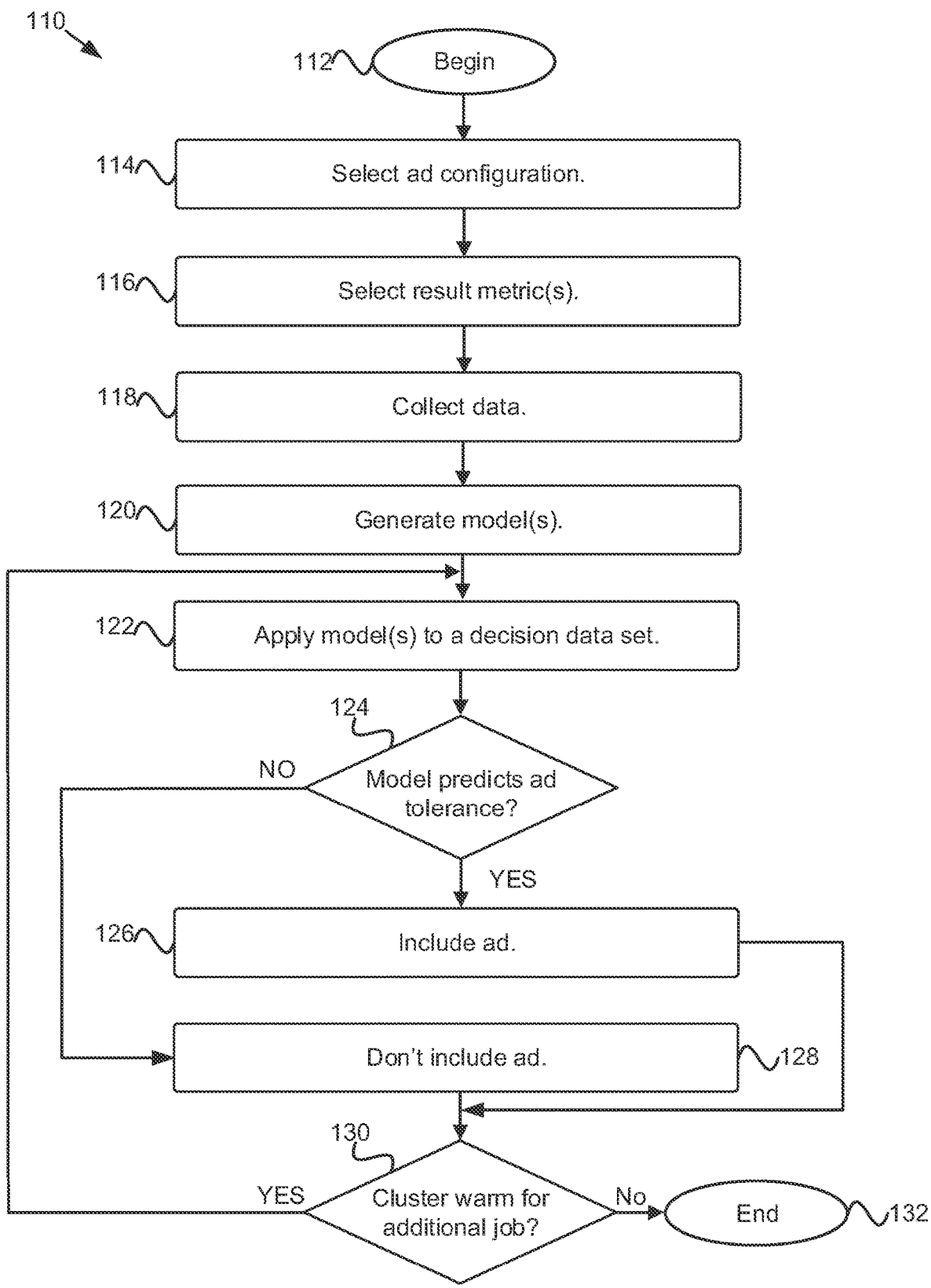
FIG. 8 is a flow chart of methods for managing the display of ad content during user visits to a webpage and/or website consistent with performance objectives for that webpage and/or web site, in accordance with examples.

Referring to FIG. 8, methods 110 for ad-display management on a webpage are depicted. The flowchart in FIG. 8 illustrates the architecture, functionality, and/or operation of possible implementations of systems, methods, and computer program products according to certain embodiments of the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

Where computer program instructions are involved, these computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block-diagram block or blocks.

These computer program instructions may also be stored in a computer readable medium that may direct a computer or other programmable data processing apparatus to function in a particular manner, such that the instructions stored in the computer-readable medium produce an article of manufacture including instruction means which implement the function/act specified in the flowchart and/or block-diagram block or blocks.

The computer program may also be loaded onto a computer or other programmable data processing apparatus to cause a series of operation steps to be performed on the computer or other programmable apparatus to produce a computer implemented process such that the instructions which execute on the computer or other programmable apparatus provide processes for implementing the functions/acts specified in the flowchart and/or block-diagram block or blocks.

It should also be noted that, in some alternative implementations, the functions noted in the blocks may occur out of the order noted in the figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The methods 110 may 112 begin with 114 selecting an ad configuration 50 and/or 116 selecting one or more performance metrics. The methods 110 may continue by, or in some examples begin with, 118 collecting data. The collection of data may include 118 collecting a first set of recorded values for one or more performance metrics from clickstream data for a set of user visits 58 to one or more training webpages 60. In such examples, the one or more training webpages may be configured consistent with an ad configuration 50 during the set of user visits.

Methods 110 may continue by 120 generating one or more probability models 82 with the set of recorded values of one or more predicted results for one or more performance metrics for future user visits 58 to the one or more training webpages 60 configured consistent with an ad configuration 50. By 122 applying one or more probability models 82 to a decision data set for a user visit, a determination 124 may be made as to whether a probability model 82 predicts that a standard will or will not tolerate an ad 86 for an additional user visit 58 to a webpage.

Where the probability model 82 indicates a relevant predicted result for the additional user visit to the webpage that satisfies the standard, the methods 110 may proceed by 126 including an ad on the webpage consistent with the ad configuration 50. Conversely, where the relevant predicted result does not satisfy the standard, the methods 110 may provide 128 the webpage consistent with an ad-free version. Once the one or more probability models have been generated, there may be no need to generate them anew.

Therefore, a determination 130 may be made as to whether there is an additional user visit 58. If the answer is yes, the methods 110 may proceed by again applying one or more models 82 to the additional user visit 58. If the answer is no, the methods 110 may end 132.

In some examples of the methods 110, 118 collecting data may involve collecting a set of feature data for the first set of user visits to the one or more training webpage correlated with the first set of recorded values of the one or more performance metrics. Such feature data may include, without limitation, information about one or more attributes of a webpage, a user visiting the webpage, a session established for a user visit to the webpage, and an ad displayed on the webpage. In such examples, 120 generating a model may involve structuring the probability model 82 to provide different predicted results for one or more performance metrics for different combinations of values for features represented in the first set of feature data. In some such examples, 120 generating a probability model 82 may involve applying a decision tree learning approach to structure the probability model 82 to provide the different predicted results for different combinations of values for features represented in the set of feature data. Methods 110 may also involve 118 collecting a second set of feature data from the additional user visit 58 to the webpage. The applications step 122 may involve 122 applying the second set of feature data to one or more probability models 82 to access the predicted result corresponding to the second set of feature data.

Methods 110 may involve 118 collecting both a second set of recorded values from additional clickstream data and a third set of feature data for a second set of user visits. In such examples, 120 generating a probability model may be accomplished with both the first set of recorded values and the second set of recorded values and both the first and third sets of feature data. The resultant probability model 82 may provide one or more predicted results for one or more performance metric, which may be a difference in predicted results between the first set of recorded values and the second set of recorded values. Such methods may involve setting the standard for the ad-tolerance determination 124 in terms of one or more limits to acceptable differences between the ad-free and ad content versions of the training webpages 60.

Methods 110 may also involve receiving an ad 86 from an external add service 68 for potential display on the webpage during an additional user visit 58. Also, in certain examples, multiple probability models 82 may be 120 generated for multiple ad configurations 50. Such methods 110 may further involve selecting an ad configuration 50 for the webpage for the new user visit 58 from among the multiple probability models 82 that satisfies the standard.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A system comprising:
one or more processors; and
one or more non-transitory computer-readable media storing computing instructions configured to run on the one or more processors and perform:
  collecting training attribute values for a set of attributes;
  generating a probability model using the training attribute values, the probability model providing predicted outcomes for at least one attribute in the set of attributes;
  identifying, using the probability model, a first predicted outcome corresponding to a subsequent combination of attribute values, the predicted outcomes comprising the first predicted outcome;
  coordinating a first display of an ad content version of a subsequent webpage when the first predicted outcome satisfies an objective of the subsequent webpage, the first display comprising:
    (a) an ad at a first location on the subsequent webpage and a webpage content in a first format at a second location on the subsequent webpage; or
    (b) the ad at a third location on the subsequent webpage and the webpage content in a second format at a fourth location on the subsequent webpage; and
  coordinating a second display of an ad-free version of the subsequent webpage when the first predicted outcome does not satisfy the objective of the subsequent webpage.

2. The system of claim 1, wherein:
the training attribute values for the set of attributes are derived from user visits of one or more users to a set of online training webpages;
the subsequent combination of attribute values is gathered from a subsequent online user visit to the subsequent webpage;
the first display of the ad content version of the subsequent webpage is shown during the subsequent online user visit;
the second display of the ad-free version of the subsequent webpage is shown during the subsequent online user visit; and
an attribute in the set of attributes comprises a characterization of a webpage with respect to a stage in a conversion funnel model.

3. The system of claim 2, wherein the computing instructions are further configured to run on the one or more processors and perform:
collecting a first set of feature data for visits of the user visits to the set of online training webpages correlated with the first predicted outcome;
structuring the probability model to provide different predicted results for the first predicted outcome for different combinations of values for features represented in the first set of feature data;
collecting a second set of feature data from the subsequent online user visit to the webpage; and
applying the second set of feature data to the probability model to access a predicted result corresponding to the second set of feature data.

4. The system of claim 3, wherein:
the computing instructions are further configured to run on the one or more processors and perform:
  collecting, for a second set of user visits to the set of online training webpages configured to be an ad-free version of the set of online training webpages:
    second training attribute values for the set of attributes from additional user visits to the set of online training webpages; and
    a third set of feature data;
  applying a standard to the probability model; and
  setting the standard in terms of at least one limit to acceptable differences for the different predicted results between the ad-free version of the set of online training webpages and an ad content version of the set of online training webpages; and
generating the probability model comprises:
  generating the probability model with the training attribute values, the second training attribute values, the first set of feature data, and the third set of feature data, the probability model providing the different predicted results for at least one performance metric comprising a difference in the different predicted results between the ad-free version of the set of online training webpages and the ad content version of the set of online training webpages.

5. The system of claim 1, wherein the training attribute values comprise:
(1) interactions between one or more users and a set of online training webpages;
(2) one or more webpages of the set of online training webpages accessed by the one or more users;
(3) time spent by the one or more users on the one or more webpages of the set of online training webpages; and
(4) queries entered by the one or more users at the one or more webpages of the set of online training webpages.

6. The system of claim 1, wherein the computing instructions are further configured to run on the one or more processors and perform:
receiving the ad from an external ad service; and
adding, to the subsequent combination of attribute values, at least one value for at least one ad attribute for the ad received from the external ad service.

7. The system of claim 1, wherein:
generating the probability model comprises:
  generating the probability model by applying at least one of a decision tree learning approach, a logistic regression approach, or a Bayesian classifier approach to the training attribute values; and
the probability model comprises a decision tree with decision points diverging according to different attribute values and leading to different predicted outcomes for different combinations of attribute values.

8. The system of claim 1, wherein the computing instructions are further configured to run on the one or more processors and perform:
adding, to the subsequent combination of attribute values, at least one value for at least one page attribute for a webpage visited during a user visit;
identifying a user of one or more users for the user visit to the webpage;

adding, to the subsequent combination of attribute values, at least one value for at least one user attribute from a record of interaction by the user of the one or more users with a website to which the webpage belongs; and adding, to the subsequent combination of attribute values, at least one value for at least one session attribute for a session established during a visit to the webpage by the user of the one or more users.

9. The system of claim 1, wherein at least one of the first location, the second location, the third location, the fourth location, the first format, or the second format is determined by a percentage of the subsequent webpage scrolled during a subsequent online user visit.

10. The system of claim 1, wherein at least one of the first location, the second location, the third location, the fourth location, the first format, or the second format is determined by the probability model with a favorable predicted outcome selected from multiple probability models in a storage volume.

11. A method being implemented via execution of computing instructions configured to run at one or more processors and configured to be stored at non-transitory computer-readable media, the method comprising:
   collecting training attribute values for a set of attributes;
   generating a probability model using the training attribute values, the probability model providing predicted outcomes for at least one attribute in the set of attributes;
   identifying, using the probability model, a first predicted outcome corresponding to a subsequent combination of attribute values, the predicted outcomes comprising the first predicted outcome;
   coordinating a first display of an ad content version of a subsequent webpage when the first predicted outcome satisfies an objective of the subsequent webpage, the first display comprising:
      (a) an ad at a first location on the subsequent webpage and a webpage content in a first format at a second location on the subsequent webpage; or
      (b) the ad at a third location on the subsequent webpage and the webpage content in a second format at a fourth location on the subsequent webpage; and
   coordinating a second display of an ad-free version of the subsequent webpage when the first predicted outcome does not satisfy the objective of the subsequent webpage.

12. The method of claim 11, wherein:
   the training attribute values for the set of attributes are derived from user visits of one or more users to a set of online training webpages;
   the subsequent combination of attribute values is gathered from a subsequent online user visit to the subsequent webpage;
   the first display of the ad content version of the subsequent webpage is shown during the subsequent online user visit;
   the second display of the ad-free version of the subsequent webpage is shown during the subsequent online user visit; and
   an attribute in the set of attributes comprises a characterization of a webpage with respect to a stage in a conversion funnel model.

13. The method of claim 12 further comprising:
   collecting a first set of feature data for visits of the user visits to the set of online training webpages correlated with the first predicted outcome;
   structuring the probability model to provide different predicted results for the first predicted outcome for different combinations of values for features represented in the first set of feature data;
   collecting a second set of feature data from the subsequent online user visit to the webpage; and
   applying the second set of feature data to the probability model to access a predicted result corresponding to the second set of feature data.

14. The method of claim 13, wherein:
the method further comprises:
   collecting, for a second set of user visits to the set of online training webpages configured to be an ad-free version of the set of online training webpages:
      second training attribute values for the set of attributes from additional user visits to the set of online training webpages; and
      a third set of feature data;
   applying a standard to the probability model; and
   setting the standard in terms of at least one limit to acceptable differences for the different predicted results between the ad-free version of the set of online training webpages and an ad content version of the set of online training webpages; and
generating the probability model comprises:
   generating the probability model with the training attribute values, the second training attribute values, the first set of feature data, and the third set of feature data, the probability model providing the different predicted results for at least one performance metric comprising a difference in the different predicted results between the ad-free version of the set of online training webpages and the ad content version of the set of online training webpages.

15. The method of claim 11, wherein the training attribute values comprise:
   (1) interactions between one or more users and a set of online training webpages;
   (2) one or more webpages of the set of online training webpages accessed by the one or more users;
   (3) time spent by the one or more users on the one or more webpages of the set of online training webpages; and
   (4) queries entered by the one or more users at the one or more webpages of the set of online training webpages.

16. The method of claim 11 further comprising:
receiving the ad from an external ad service; and
adding, to the subsequent combination of attribute values, at least one value for at least one ad attribute for the ad received from the external ad service.

17. The method of claim 11, wherein:
generating the probability model comprises:
   generating the probability model by applying at least one of a decision tree learning approach, a logistic regression approach, or a Bayesian classifier approach to the training attribute values; and
the probability model comprises a decision tree with decision points diverging according to different attribute values and leading to different predicted outcomes for different combinations of attribute values.

18. The method of claim 11 further comprising:
adding, to the subsequent combination of attribute values, at least one value for at least one page attribute for a webpage visited during a user visit;
identifying a user of one or more users for the user visit to the webpage;
adding, to the subsequent combination of attribute values, at least one value for at least one user attribute from a record of interaction by the user of the one or more users with a website to which the webpage belongs; and adding, to the subsequent combination of attribute values, at least one value for at least one session attribute for a session established during a visit to the webpage by the user of the one or more users.

19. The method of claim 11, wherein at least one of the first location, the second location, the third location, the fourth location, the first format, or the second format is determined by a percentage of a subsequent webpage scrolled during the subsequent online user visit.

20. The method of claim 11, wherein at least one of the first location, the second location, the third location, the fourth location, the first format, or the second format is determined by the probability model with a favorable predicted outcome selected from multiple probability models in a storage volume.

* * * * *